United States Patent [19]

Lea

[11] Patent Number: 4,947,972

[45] Date of Patent: Aug. 14, 1990

[54] AXIALLY FRANGIBLE AUTOMATIC TORQUE LIMITING CLUTCH

[76] Inventor: Bruce K. Lea, 2324 Venetia Rd., Mobile, Ala. 36605

[21] Appl. No.: 389,331

[22] Filed: Aug. 3, 1989

[51] Int. Cl.$^5$ .......................... F16D 7/02; F16D 3/14
[52] U.S. Cl. .................... 192/56 R; 464/48; 403/02
[58] Field of Search ................. 192/56 R; 464/48, 33; 403/02

[56] References Cited

U.S. PATENT DOCUMENTS

| 987,954 | 3/1911 | Brush | 192/70.2 |
| 1,172,146 | 2/1916 | Loomis | 192/70.2 |
| 4,401,426 | 8/1983 | Heidenreich | 464/48 |
| 4,464,137 | 8/1984 | Jennings | 464/48 |
| 4,617,003 | 10/1986 | Bober et al. | 464/48 |
| 4,859,156 | 8/1989 | Kikuchi | 403/2 |

FOREIGN PATENT DOCUMENTS

| 1000183 | 1/1957 | Fed. Rep. of Germany | 464/48 |
| 1251174 | 12/1960 | France | 464/48 |
| 1043377 | 9/1983 | U.S.S.R. | 464/48 |

Primary Examiner—Leslie A. Braun
Assistant Examiner—Andrea Pitts
Attorney, Agent, or Firm—Richard C. Litman

[57] ABSTRACT

A mechanical automatic torque limiting clutch containing an axially frangible and easily replaceable component is disclosed. The clutch is capable of limiting torque output by adjusting the friction between spring loaded input and output plates, and further is capable of preventing damage to other driveline components due to axial tension loads imparted to the driveline. The clutch allows a central axial bolt to break in tension should axial tension loads be applied which exceed the limits of the bolt, thereby protecting the remainder of the driveline components. When such a break occurs, the only damage done is to the bolt itself, which allows the input and output sides of the clutch to separate into two components which are quickly, easily and economically reassembled with a new bolt. Provision for weaker tensile loads is provided by use of bolts containing one or more grooves or indentations, which serve to reduce the cross sectional area and therefore the tensile strength of the bolt to the desired degree, or with a smaller diameter bolt and properly sized sleeves in order to prevent play between the bolt and axial bolt hole.

8 Claims, 2 Drawing Sheets

AXIALLY FRANGIBLE AUTOMATIC TORQUE LIMITING CLUTCH

FIELD OF THE INVENTION

This invention relates generally to mechanical torque limiting devices, and more specifically to a mechanical torque limiting clutch which is capable of protecting other components in the system from axial tension loads.

BACKGROUND OF THE INVENTION

Torque limiting devices of various sorts are well known in many fields where mechanical power transmission is used. Such devices are generally found with various combinations of motors or engines and their associated transmissions, speed reduction systems, etc. The use of such torque limiting devices is especially valuable in systems in which the output shaft is subject to sudden stoppage or overload. Such a torque limiting device will slip in such a situation and protect the powerplant and/or transmission from potential damage due to the sudden stoppage or overload, as may be encountered in the operation of a boat should the propeller become fouled.

While this device performs adequately in terms of preventing damage to the remainder of the drive system of the boat due to torsion forces, in many cases an additional tension force is produced axially along the drive line of the boat due to the propeller being caught or snagged on a stationary object and the mass and inertia of the boat remaining in motion. On occasion an axial tension force may also be produced when a propeller picks up a rope or line, which is then wrapped around the rotating propeller shaft. This buildup of material around the shaft in combination with the tension on the line as it is drawn onto the shaft may cause the line to pack around the shaft, spreading longitudinally along the shaft between the propeller and bearing support or other structure and forcing the propeller out from that support or structure. The net result of such an incident is very often the same as that of the propeller catching on a stationary object, i.e., an axial tension force is applied to the drive system.

Typically, the drive system in such a boat comprises an engine, a reduction drive and/or transmission, a drive shaft, an external shaft bearing and support assembly, and a propeller. These components are typically assembled with one or more connecting flanges along the shaft between components. Such a system is generally not designed to accept large forces along the axis of the drive system; thrust forces which would produce a compressive axial force along the drive line are transmitted to the hull by means of the bearing support assembly. Generally, the axial tension forces generated by normal thrust reversal are insufficient to cause damage to any component due to the relative inefficiency of the propeller operating in the reverse direction as well as the generally smaller power output and slower speeds desired during such reverse operations.

Thus, when some fouling of the propeller occurs as described above the typical drive line is incapable of accepting the resulting axial tension forces and damage to one or more components occurs. The typical "weak link" in the system is the speed reduction gear box, which provides little in the way of axial load protection either in tension or compression. When such a reduction gear box fails due to tension loads along the drive shaft, the resulting damage is relatively costly and time consuming to repair, possibly costing an operator tens of thousands of dollars when the time the boat is out of commission is considered.

What is needed is a torque limiting clutch which is also capable of limiting the amount of axial tension force which may be applied along the drive shaft, thus protecting all other components in the system. Such a device should be relatively simple and inexpensive to repair, allowing a boat using such a device to be quickly repaired using commonly available parts with a minimum of lost time.

DESCRIPTION OF THE RELATED ART

Numerous patents are known which disclose various mechanical torque limiting devices. Lindgren U.S. Pat. No. 3,090,213 discloses a mechanical torque limiting clutch of the general configuration of the present invention. However, this device is intended to accept input radially around the output shaft by means of a belt drive, the clutch being located at one end of the output shaft. Thus, the device could not be installed axially along a single linear drive shaft as the present invention is suited. Moreover, the device provides no intentionally frangible, easily replaced component should excessive axial tension forces be developed along the output shaft.

Kopp U.S. Pat. No. 3,984,999 and Heidenreich U.S. Pat. No. 4,401,426 both serve as further examples of mechanical automatic torque limiting devices which, insofar as their basic principle of operation is concerned, function in a similar manner to the torque limiting function of the present invention. Neither, however, is capable of preventing damage to other drive line components due to excessive axial tension forces.

Jennings U.S. Pat. No. 4,464,137 discloses yet another mechanical torque limiting device. This device, however, will not allow complete rotation of input and output shafts relative to one another, but contains stops to allow only partial rotation and furthermore provides no method of preventing damage to other components due to excessive axial tension forces, as does the present invention.

None of the above listed patents, either singly or in combination, is seen to disclose the specific arrangement of concepts disclosed by the present invention.

SUMMARY OF THE INVENTION

By the present invention, an improved mechanical torque limiting clutch which is also capable of protecting other drive line components from excessive axial tension forces is provided.

Accordingly, one of the objects of the present invention is to provide an improved torque limiting clutch which includes a single component connecting input and output shafts and which component is axially frangible should excessive axial tension force be applied to the clutch and drive line system.

Another of the objects of the present invention is to provide an improved torque limiting clutch which axial tension load limiting component may be quickly, easily, and economically replaced with a commonly available part or relatively few parts.

Yet another of the objects of the present invention is to provide an improved torque limiting clutch which instantly and completely disconnects input and output shafts should excessive axial tension loads occur, thus preventing any further turning of the output shaft and propeller of a boat if so installed and thereby preventing further wrapup of any material drawn onto the propeller shaft, as well as preventing any further damage to such a propeller.

Still another object of the present invention is to provide an improved torque limiting clutch in which any predetermined limit for axial tension loads may be provided by the installation of a properly sized or dimensioned tension limiting component.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
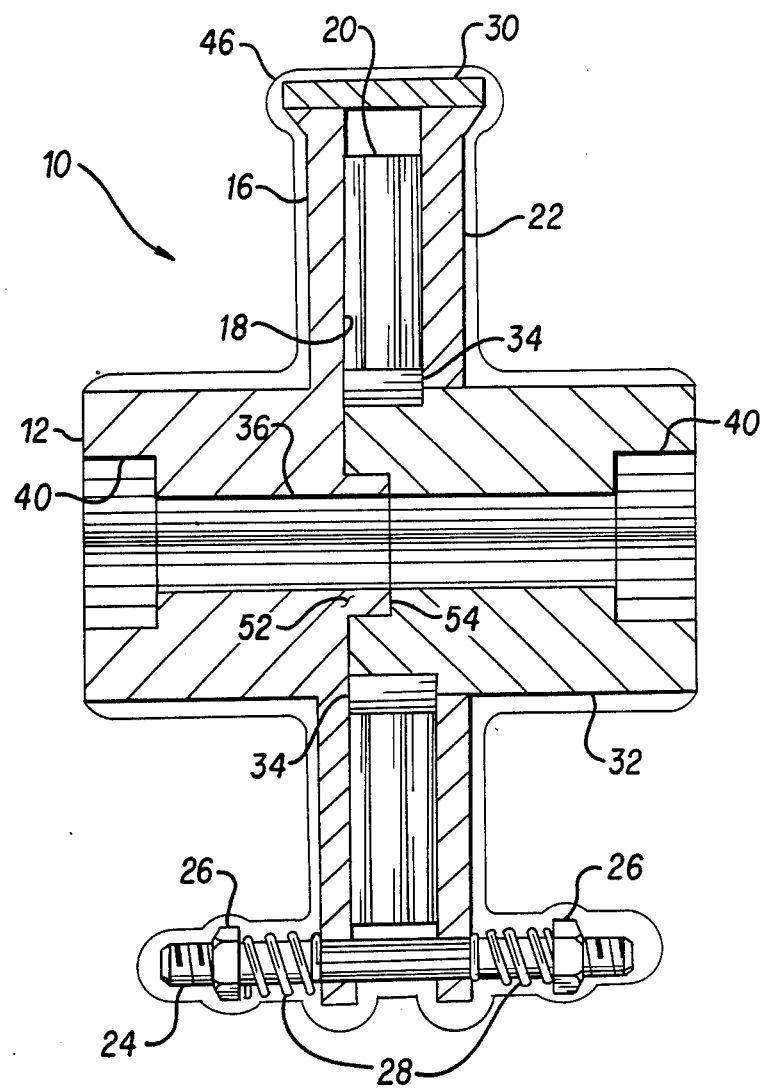
FIG. 1 is a side view in section of the assembled clutch.

Referring now to the drawings, particularly FIG. 1, the present invention will be seen to relate to a mechanical torque limiting clutch assembly 10. Clutch assembly 10 may accept power from drive system D through input shaft 12. Input shaft 12 may be keyed, splined or otherwise formed to attach and maintain a fixed relationship to other components of drive system D. Input shaft 12 is permanently affixed to primary input plate 16, either by welding or otherwise joining the two components or by machining or otherwise forming them from a single piece of material.

The friction face 18 of primary input plate 16 is biased so as to bear against friction plate 20, thereby transferring torsional forces from drive system D to friction plate 20. Secondary input plate 22, on the opposite side of friction plate 20 from primary input plate 16, is maintained in a fixed rotary relationship to primary input plate 16 by means of friction limiting adjustment bolts 24, nuts 26 and springs 28. Keyways and keys 30 may also be incorporated in the periphery of primary and secondary input plates 16 and 22 in order to further maintain the fixed rotary relationship between the two plates 16 and 22. A greater or lesser number of adjustment bolts 24, nut 26, and springs 28, as well as keyways and keys 30, than shown in the drawings may be incorporated with clutch 10 as required.

Figure 2:
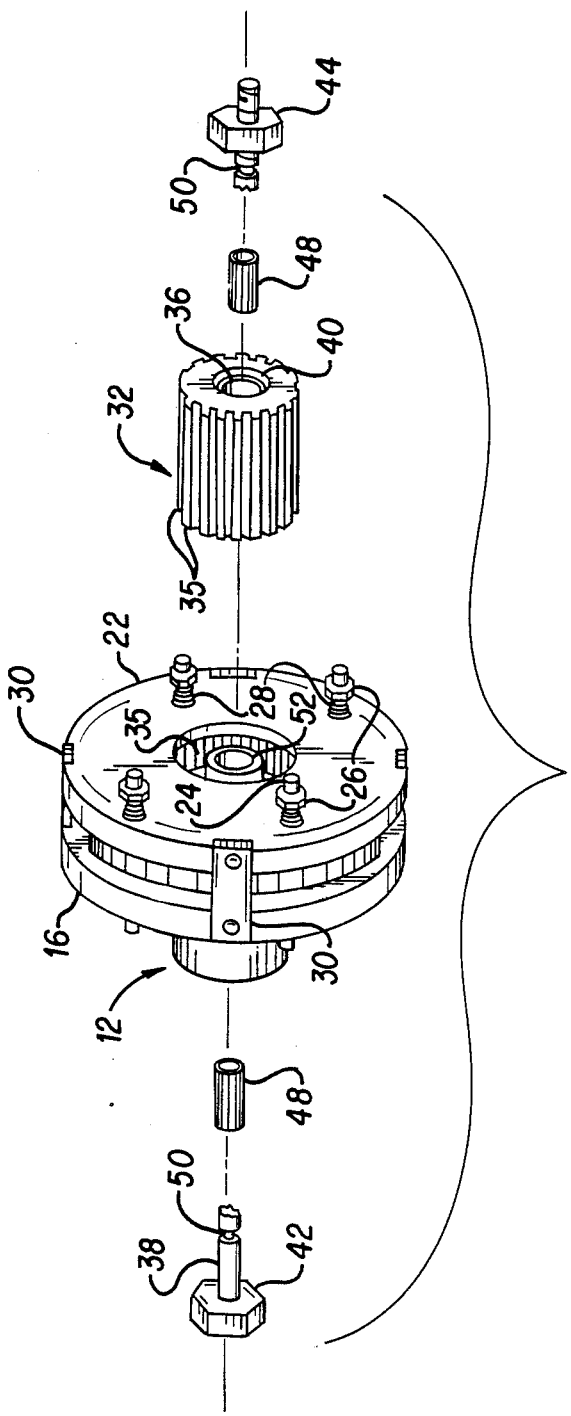
FIG. 2 is a perspective view of the clutch assembly, demonstrating the separation of components upon breakage of the axially frangible component.

Friction plate 20 is maintained in a fixed relationship with output shaft 32 by means of keyways and keys 34, as shown in FIG. 1. Alternatively, splines 35 may be used to maintain this fixed relationship between friction plate 20 and output shaft 32, as shown in FIG. 2. Thus, output shaft 32 is allowed to rotate freely within the center of secondary input plate 22, depending upon any slippage which may occur between primary and secondary input plates 16 and 22, and friction plate 20 located therebetween. By adjusting the compression of springs 28 bearing against primary and secondary input plates 16 and 22 by adjusting bolts 24 and nuts 26, the biasing force of primary and secondary input plates 16 and 22 against friction plate 20 may be precisely adjusted in order to limit the amount of torque transmitted through clutch assembly 10.

Although only a single friction plate 20 is shown between primary input plate 16 and secondary input plate 22 for reasons of clarity, a plurality of friction plates 20 may be installed between primary input plate 16 and secondary input plate 22 if desired. Each friction plate 20 would be splined or keyed to output shaft 32 as described above. A plurality of intermediate input plates, not shown but each identical to secondary input plate 22, may be installed between each friction plate and held in a fixed relationship to primary input plate 16 by means of the friction limiting adjusting bolts 24 and keys 30 described above. Such a plurality of friction plates 20 installed alternatingly with intermediate input plates and in turn installed between primary input plate 16 and secondary input plate 22 would provide greater frictional area and therefore the capability to transmit greater torque forces before reaching a limit than would such a clutch 10 with only a single friction plate 20.

Input shaft 12 and output shaft 32 each contain an axial bore 36 in order to accept a bolt 38. Input and output shafts 12 and 32 also each contain a counterbore 40 in order to accept the head 42 and securing nut 44 of bolt 38. Bolt 38 is installed within the bore 36 of input and output shafts 12 and 32 and serves to secure output shaft 32 to the remainder of clutch assembly 10. The remainder of clutch assembly 10 other than output shaft 32 is secured together by friction limiting adjustment bolts 24, nuts 26 and springs 28. A cover 46 of some suitable material may be used to protect the clutch assembly 10 from the elements.

Figure 3:
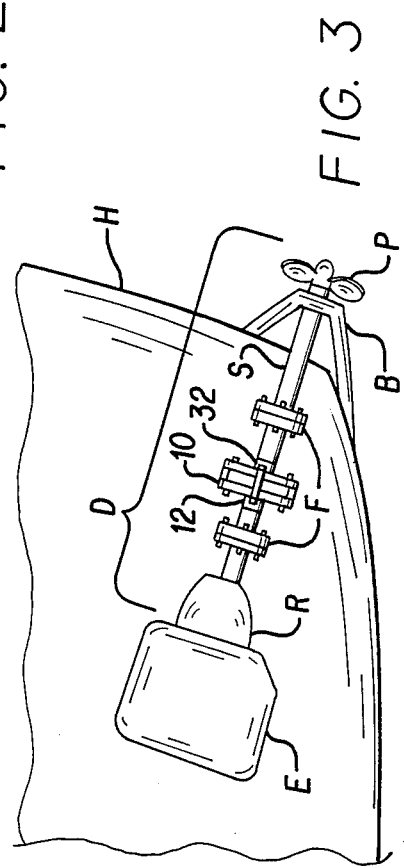
FIG. 3 is a side view of a typical propulsion system of a boat in which the present invention may be installed, showing the relationship between components.

Typically, such a clutch assembly 10 is installed in line with other components of the drive system D, as shown in FIG. 3. These components include an engine E, reduction gear box R, and flanges F separating one or more of the components from other components for ease of assembly and repair. Alternatively, flanges F may be incorporated with the input and output sides of clutch assembly 10. The output of drive system D is in this case directed to a propeller P by means of driveshaft S through a bearing support B, and shown as would be typically installed in a boat hull H.

As input shaft 12 and output shaft 32 are respectively fixedly attached to the input and output sides of driveline D, the only component securing the output side of driveline D from axial displacement is bolt 38, other than whatever axial loads may be absorbed by bearing support B. Bolt 38 may be chosen to be of any suitable diameter in order to provide the desired ultimate tensile strength required to secure input and output shafts 12 and 32 and thus the relative sides of driveline D together. If a bolt 38 of smaller outside diameter than the inside diameter of bore 36 is desired, sleeves 48 of the appropriate inside and outside diameter may be installed with bolt 38 in order to prevent excess play or movement of the bolt 38 within bore 36. Alternatively, a bolt 38 of too large a diameter and tensile strength may be provided with grooves 50 or other indentations in order to lessen the effective diameter of the bolt 38 at that point, and thereby provide the desired ultimate tensile strength.

In order to further secure input shaft 12 and output shaft 32 concentrically, a boss 52 is formed on input shaft 12 so as to closely fit within a counterbore 54 formed within output shaft 32. In this way, should bolt 38 be undersize, stretched or become loosened within bore 36, input and output shafts 12 and 32 will remain concentric relative to each other, thus preventing misalignment of other components of driveline D. However, the boss 52 of input shaft 12 and cooperating counterbore 54 of output shaft 32 only serve to secure input and output shafts 12 and 32 in a concentric relationship. Shafts 12 and 32 are otherwise free to rotate with respect to one another, depending upon the torque used to secure nut 44 to bolt 38 and the friction generated by primary and secondary input plates 16 and 22 and friction plate 20.

In order to provide for maximum efficiency of the clutch assembly 10, it is desired that the compression of input and output shafts 12 and 32 be kept to a minimum by limiting the torque used to secure nut 44 and bolt 38. In this way, the friction produced between input plates 16 and 22 and friction plate 20 will be able to perform the desired function of supplying the predominant share of torque limiting frictional forces.

In a typical installation as shown in FIG. 3, the normal forces produced by a propeller P will be compressive along the axis of driveline D. The typical components forming driveline D are generally capable of absorbing such compressive forces, with bearing support B typically absorbing the greatest amount of those forces and in turn transmitting them to hull H. The relatively small forces encountered in reversing maneuvers are also generally quite capable of being absorbed by driveline D. Such forces are invariably less than the compressive forces encountered by driveline D caused by forward thrust of propeller P, due to the relative inefficiency of the propeller P when operating opposite to the direction of forward rotation for reversing maneuvers.

However, the driveline D is not intended to absorb relatively large tensile forces. Normally such forces would not be encountered in reversal maneuvers, but unusual situations may occur which may produce these large tensile forces. Such a situation may occur in shallow water should the propeller P become snagged on the bottom while in forward motion. The inertial forces involved will tend to cause the hull H of the boat to remain in forward motion while the propeller P remains behind, thus producing a large tensile force along driveline D. While no component of driveline D is designed to absorb such forces, including clutch assembly 10, the clutch assembly 10 will serve to limit the amount of these tensile forces by means of bolt 38.

At times a propeller P may pick up a line or rope and cause it to wrap around the propeller shaft between bearing support B and propeller P. As the rope wraps up on the shaft, any tension on the rope will tend to reduce the diameter of the resulting mass of rope upon the shaft, which will further cause the windings of the rope to spread along the shaft, thus tending to force propeller P apart from bearing support B. Such an incident may result in a relatively large tensile force upon driveline D. Once again, by installing the proper size bolt 38 within input and output shafts 12 and 32 of clutch assembly 10, the bolt will serve as the weakest point in the driveline D and will break before any other component is damaged.

By providing a "weak link" within input and output shafts 12 and 32, any broken bolt 38 may be relatively easily, quickly and inexpensively replaced by removing the components of driveline D which are secured to the input and output shafts 12 and 32 of clutch assembly 10, thus enabling any broken bolt 38 to be removed. A new bolt 38 may then be installed to secure input and output shafts 12 and 32 together, and the components of driveline D reassembled upon input and output shafts 12 and 32 thereby again rendering the system operable.

It is to be understood that the present invention is not limited to the sole embodiment described above, but encompasses any and all embodiments within the scope of the following claims.

I claim:

1. An axially frangible, automatic torque limiting mechanical clutch, comprising;
    an input shaft,
    said input shaft fixedly attached to a primary input plate,
    a secondary input plate,
    said secondary input plate rotatingly affixed to and biased toward said primary input plate by means of frictional limit adjusting bolts contained adjacent the periphery of said primary and said secondary input plates,
    at least one friction plate,
    said at least one friction plate assembled between said primary input plate and said secondary input plate,
    said at least one friction plate rotatingly affixed to an output shaft,
    said output shaft concentrically cooperating with said input shaft,
    said input and said output shaft each containing a concentric axial bore,
    said bore providing for the insertion of an axial bolt,
    said axial bore is of a larger diameter than said axial bolt and is fitted with a sleeve,
    the inside diameter of said sleeve closely cooperating with the diameter of said axial bolt,
    the outside diameter of said sleeve closely cooperating with the diameter of said axial bore, whereby
    an axial bolt of predetermined size and tensile strength is installed within said larger diameter axial bore and said sleeve,
    thus preventing excessive play between said axial bolt and said larger diameter axial bore.

2. The axially frangible clutch of claim 1 wherein;
    said primary input plate and said secondary input plate contain a single friction plate therebetween.

3. The axially frangible clutch of claim 1 wherein;
    said primary input plate and said secondary input plate, contain keyways,
    said keyways are formed in the periphery of said primary and said secondary plates between said friction limiting adjustment bolts,
    said keyways containing keys,
    said keys serving to further cause said primary and said secondary plates to remain rotationally affixed relative to one another.

4. The axially frangible clutch of claim 1 including;
    a cover capable of protecting said axially frangible clutch from the elements.

5. The axially frangible clutch of claim 1 wherein;
    said at least one friction plate and said output shaft are rotatingly affixed to one another by means of keyways and keys.

6. The axially frangible clutch of claim 1 wherein;
    said at least one friction plate and said output shaft are rotatingly connected to one another by means of splines.

7. The axially frangible clutch of claim 1 wherein;

said axial bolt contains circumferential grooves, whereby said axial bolt is provided with a maximum cross sectional area and tensile strength according to the depth of said circumferential grooves.

8. The axially frangible clutch of claim 1 wherein;

said input shaft includes a boss, said output shaft includes a counterbore, said boss of said input shaft closely fitting and cooperating with said counterbore, thereby preventing radial movement of said input shaft relative to said output shaft.

* * * * *